United States Patent
Tanaka

(10) Patent No.: US 8,104,164 B2
(45) Date of Patent: Jan. 31, 2012

(54) METHOD OF MANUFACTURING A ROTOR OF ELECTRIC ROTATING MACHINE

(75) Inventor: Kazunori Tanaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/749,361

(22) Filed: May 16, 2007

(65) Prior Publication Data

US 2007/0214633 A1 Sep. 20, 2007

Related U.S. Application Data

(62) Division of application No. 10/554,514, filed on Oct. 26, 2005, now Pat. No. 7,382,073.

(51) Int. Cl.
*H02K 15/02* (2006.01)
*H02K 15/10* (2006.01)

(52) U.S. Cl. ............. 29/598; 29/421.1; 29/605; 29/606; 242/174; 242/176

(58) Field of Classification Search .................... 29/598, 29/421.1, 596, 599, 605, 606; 242/174, 176; 310/43, 64, 214, 215, 263
See application file for complete search history.

(56) References Cited

U.S. PATENT DOCUMENTS

| | | | | |
|---|---|---|---|---|
| 3,412,354 A | * | 11/1968 | Sattler | 336/205 |
| 4,009,306 A | * | 2/1977 | Yamashita et al. | 427/374.4 |
| 4,037,312 A | * | 7/1977 | Deis | 29/598 |
| 4,988,055 A | * | 1/1991 | Sakai et al. | 242/159 |
| 5,714,822 A | | 2/1998 | Kawano et al. | |
| 6,037,694 A | | 3/2000 | Asao et al. | |
| 7,170,206 B2 | * | 1/2007 | Laxenaire et al. | 310/43 |

FOREIGN PATENT DOCUMENTS

| | | |
|---|---|---|
| JP | 3711058 B1 | 8/1962 |
| JP | 58141512 A | 8/1983 |
| JP | 60160108 A | 8/1985 |
| JP | 02-186606 A | 7/1990 |
| JP | 2005-328651 A | 12/1993 |
| JP | 5328651 A | 12/1993 |
| JP | 06-302454 A | 10/1994 |
| JP | 9168226 A | 6/1997 |
| JP | 11-307358 A | 11/1999 |
| JP | 2000092768 A | 3/2000 |
| JP | 200266629 A | 3/2002 |
| JP | 2002284446 A | 10/2002 |
| JP | 2002336760 A | 11/2002 |

OTHER PUBLICATIONS

Supplementary European Search Report corresponding to 04731480 dated Jan. 4, 2010.

* cited by examiner

*Primary Examiner* — Thiem Phan
(74) *Attorney, Agent, or Firm* — Sughrue Mion, PLLC

(57) ABSTRACT

A manufacturing method of a rotor of and AC generator for a vehicle according to the invention includes the steps of applying a fluid resin material to a conductor immediately before the conductor is wound on a spool, and heating the entire structure to cause the resin to be heat-cured after the conductor to which the fluid resin material has been applied is wound around the spool in multi-rows and multi-layers.

6 Claims, 5 Drawing Sheets

(a)

(b)

(a)

(b)

METHOD OF MANUFACTURING A ROTOR OF ELECTRIC ROTATING MACHINE

This is a divisional of application Ser. No. 10/554,514 filed Oct. 26, 2005 now U.S. Pat. No. 7,382,073. The entire disclosure of the prior application, application Ser. No. 10/554,514 is hereby incorporated by reference.

TECHNICAL FIELD

The present invention relates to a rotor of an electric rotating machine in which conductors are wound in multi-rows and in multi-layers, and a manufacturing method thereof; and, more particularly, the invention relates to a rotor winding of an AC generator to be mounted onto, e.g., a vehicle, and a manufacturing method thereof.

BACKGROUND ART

In rotors of AC generators for vehicles, it is a recent trend that a larger output from a generator is required due to increase of electric load in the vehicle. Thus, a rotor is constructed such that a conductor is wound in multi-rows and multi-layers to enhance the efficiency of space. Further, in the rotor, after the conductor has been wound a predetermined number of times, resin is applied or put in drops at points where the conductor is exposed from a spool, that is, from the outer circumferential side of the outermost layer to protect the conductor from heat or foreign matter. Furthermore, to deal with the effect of a centrifugal force provided by the rotation, a protective tape is wound on the outermost circumference over the entire circumference to assure the resistance to a centrifugal force. (For example, see the Japanese Patent No. 3383143).

On the other hand, in the conventional multi-layer wound coils, a large number of through holes are provided in the tubular part, and this tubular part is immersed in varnish, or is brought in drops of varnish and impregnated, whereby the varnish is made to penetrate into deep portions of coil to cause the coil to be stabilized. (For example, see the Japanese Utility Model Publication laid-open No. 20020/1986).

However, according to such a conventional manufacturing method of a rotor, a problem exists in that even if resin is applied, for example, from the outer circumferential surface that is exposed from the spool, in the case of multi-layers, the resin will not reach into the innermost layers due to subsequent heating, and the resin is heat-cured in the state in which air is interposed between the coils, thus the coil being subjected to heat and friction. Furthermore, according to the method in which resin is made to penetrate between conductors by immersing the conductors in varnish, or by dripping and impregnating varnish into between the conductors, it is necessary for a plurality of dipping holes to be formed in the spool. Therefore, the strength required for a spool for use in rotors cannot be assured, thus there remains the possibility of deformation and breakdown. Moreover, the fact that the alignment state of conductor of multi-rows and multi-layers is changed due to such deformation of the spool, thereby the conductor being damaged, may results in failure of a power generator itself. In addition, in the case of a coil densely wound in significant numbers of layers, e.g., dozens of layers, it is considerably difficult that an impregnating varnish is uniformly run into between the coils even when the varnish is impregnated through impregnation holes. This is because, most windings, which are aligned in multi-layers and in high density, are in the state in which they are staggered to be adjacent and in close contact with each other, i.e., they are in the state of so called "traverse winding", thus making it hard to form channels of a viscous resin penetrating into the deep layer portion (winding area deeply surrounded by the winding in the state of having been wound). In case of being wound in considerable numbers of rows, holes corresponding to the number of rows have to be formed in the tubular part of the spool. Thus, a further problem of affecting insulation properties arises in the case where an iron core is located on the inner circumferential side.

The present invention was made to solve the above-described problems, and has an object of obtaining a rotor of an electric rotating machine making it possible to suppress the loss of shape, damage and the like of a multi-layer conductor, and to ensure higher reliability even in the case that a rotor, in which multi-rows and multi-layers of winding is formed, is mounted on a vehicle and driven to rotate continuously.

A further object of the invention is to improve a cooling capability of winding, thereby enabling improved output per number of turns of windings.

DISCLOSURE OF INVENTION

A rotor of an AC generator for vehicle according to the present invention includes: a rotary shaft; a field core that is pivotally mounted onto this rotary shaft, and rotates integrally therewith; an annular conductor spool that is disposed on this field core; and a conductor that is wound around this conductor spool in multi-rows and multi-layers;

the rotor being characterized in that at least gaps between the conductors at the deep layer portion out of the gaps between the aligned conductors from the innermost layer to the outmost layer of a number of layers are filled uniformly with resin layers.

A manufacturing method of a rotor of an AC generator for vehicle according to the invention is characterized by including the steps of: applying a fluid resin material to the mentioned conductor immediately before a conductor is wound on a spool; and heating the entire structure to cause the mentioned resin to be heat-cured after the conductor, to which the mentioned fluid resin material has been applied, is wound around the mentioned spool in multi-rows and multi-layers.

As a result, it is possible to suppress the loss of shape and damage of a multi-layer conductor due to continuous rotational vibration. Further, an advantage exists in effects of significantly improved thermal conductivity, and increased output per number of turns.

BRIEF DESCRIPTION OF DRAWINGS

FIG. 5(*b*) is an enlarged view about a conductor of FIG. 4(*a*)

BEST MODE FOR CARRYING OUT THE INVENTION

Embodiment 1

Figure 1:
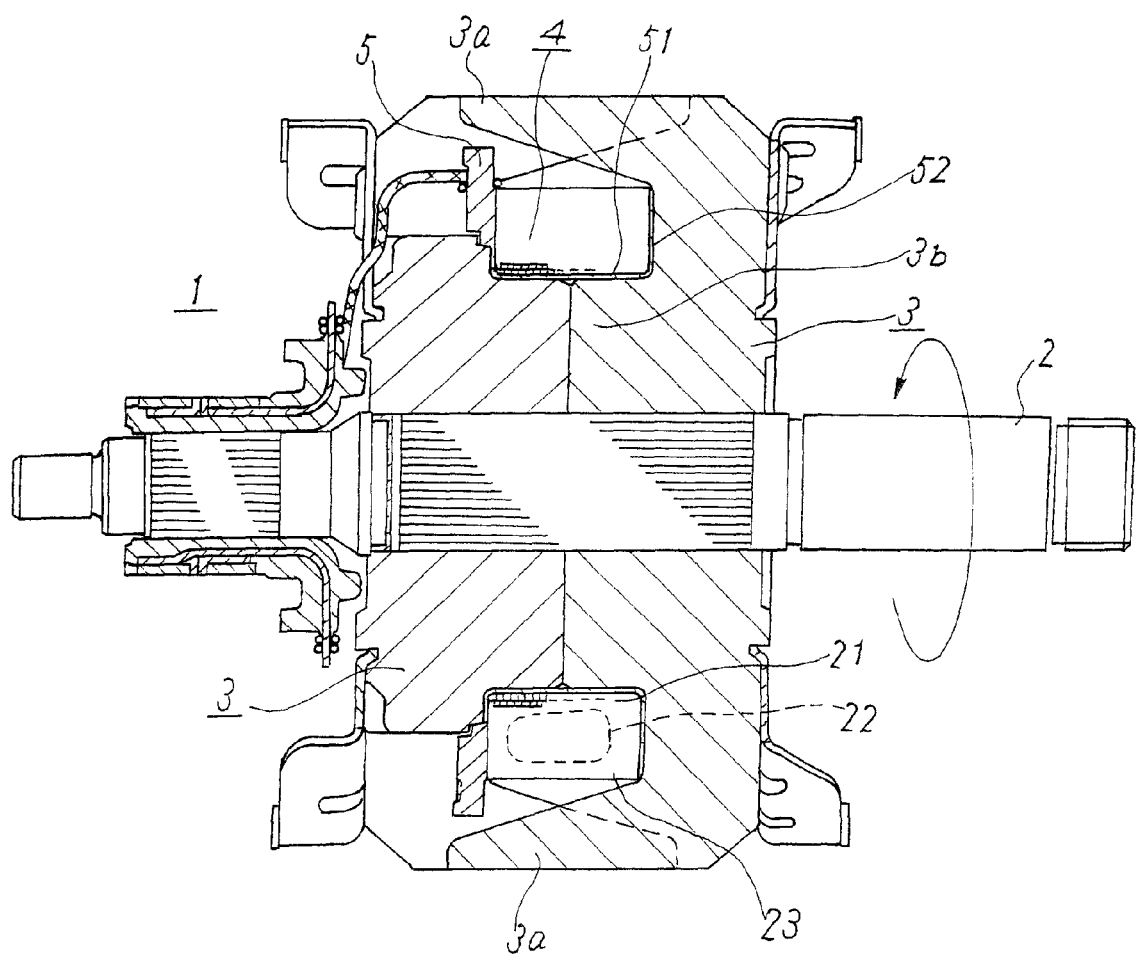
FIG. 1 is a cross sectional view of a rotor of an AC generator for vehicle showing a first preferred embodiment according to the present invention.
Figure 2:
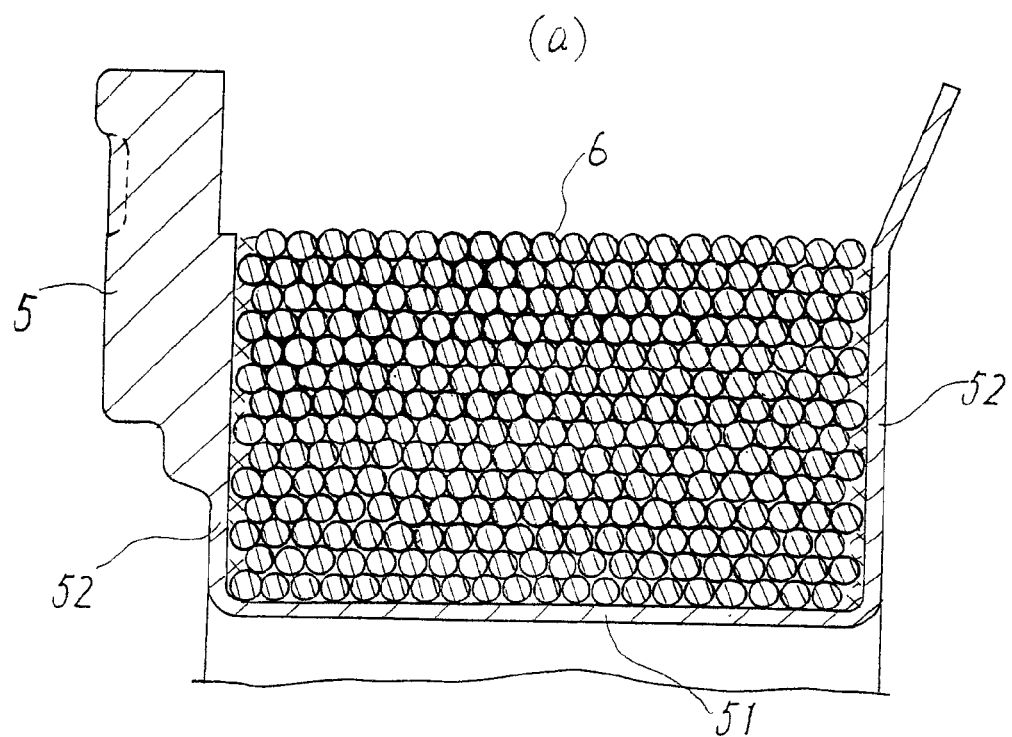
FIG. 2(a) is an enlarged cross sectional view of an essential part of a spool portion showing the first embodiment according to the invention.
FIG. 2(b) is an enlarged view about a conductor of FIG. 2(a).
Figure 2:
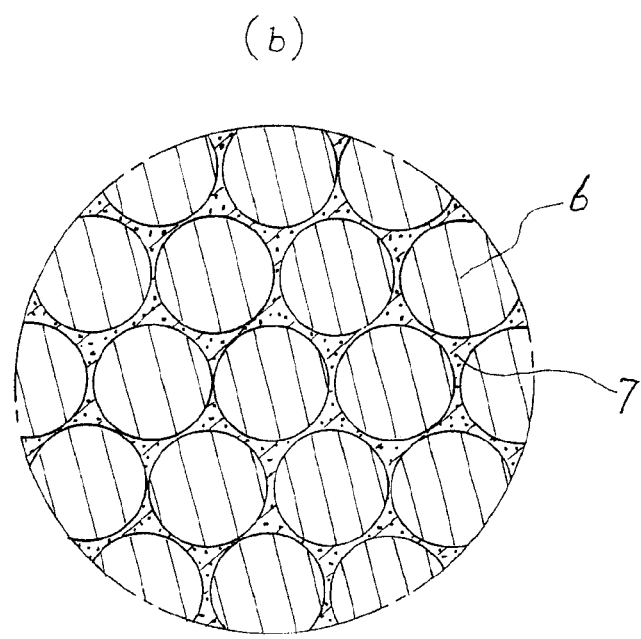

FIG. 1 shows a rotor of electric rotating machines according to a first preferred embodiment of the present invention, and FIG. 2 is an enlarged view of an essential part of a spool portion thereof. According to this first embodiment, an AC generator for vehicle is employed as an electric rotating machine. With reference to FIGS. 1 and 2, a rotor 1 is provided with a rotary shaft 2 with which a belt, not shown, is engaged, and is driven to rotate by an internal combustion engine of vehicles. Furthermore, the rotor 1 includes a pair of claw-shaped pole-type field cores 3 to be fitted to the rotary shaft 2. This pair of field cores 3 includes a plurality of pole claws 3*a* that extend being curved mutually to the other side on the outer circumferential portion, and iron core tubular portions 3*b* that are formed integrally with those pole claws 3*a*. Further, this pair of field cores 3 is located in opposition so that the pole claws 3*a* are alternately engaged with each other. Inside of the opposed pole claws 3*a*, a field winding 4 is sandwiched. The field winding 4 consists of an annular spool 5 of U-shape in cross section, and conductors 6 to be wound around this spool 5. The conductor 6 is a round wire of, for example, 0.8 mm in diameter, and is wound densely in multi-rows as well as multi-layers such as twenty-odd rows and ten-odd layers The conductor 6 is densely accommodated along with a resin 7 in a space surrounded by a hollow part 51 and disc-like side parts 52 that extend in radial direction from axial ends of the hollow part 51 of the spool 5. The iron core tubular portions 3*b* of the field core 3 are disposed in a press-fitted state on the inner circumferential side of the above-mentioned hollow part 51.

In the rotor of an AC generator for vehicle constructed as described above, the rotor is made to continuously rotate via a belt by means of, e.g., an internal combustion engine, not shown, and a centrifugal force will be exerted on this rotor. Furthermore, heat is generated from the conductor 6, the field cores 3, etc. due to conduction and power generation.

Now, an example of manufacturing method of a field winding of the mentioned rotor is described.

Figure 3:
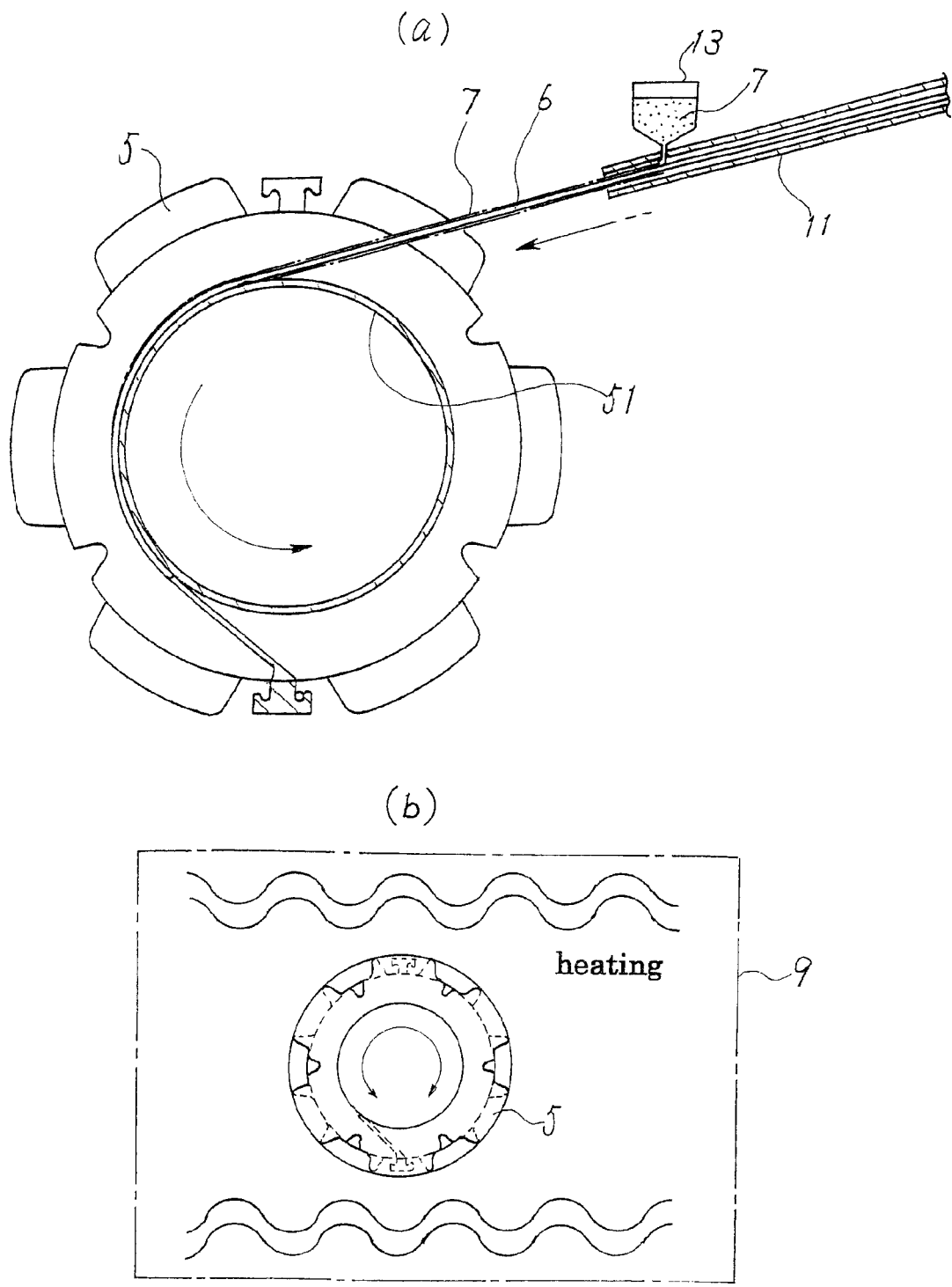
FIG. 3(a) is a winding step view showing a winding manufacturing method of the rotor according to the invention.
FIG. 3(b) is a schematic diagram showing heat-curing step of the winding manufacturing method according to the invention.

FIG. 3 shows a manufacturing process of densely winding the conductor 6 inside the spool 5 along with the resin 7, and this manufacturing process consists of the following steps.

(A) First Step (Refer to FIG. 3(*a*))

FIG. 3(*a*) is a schematic view of a winding apparatus for carrying out the invention. In the drawing, reference numeral 5 designates the above-described spool. Numeral 6 designates a conductor, which is wound under a predetermined tension from a delivery bobbin, not shown, by counter-clockwise rotation of the mentioned spool 5. Numeral 11 designates a winding nozzle, and at the leading end portion of this winding nozzle 11, there is provided a hopper 13 that contains therein a resin 7.

Shortly before the conductor 6 is wound on the spool 5 made by insulating resin molding, the fluid insulating resin material 7 such as epoxy resin is applied from the hopper 13 to a single piece of the conductor 6 extending in a tangent direction of the hollow part 51. Then, the spool 5 is made to rotate, thus the conductor 6 is wound. With reference to FIG. 3(*a*), the spool 5 is shown in a cross sectional view in a direction orthogonal to the shaft, and in which the conductor 6 is wound beginning with the innermost layer.

(B) Second Step (Refer to FIG. 3(*b*))

After the mentioned conductor 6 is wound around the spool 5 along with the resin 7, the entire spool is heated in a heating furnace 9, and the resin 7 having been applied is heat-cured.

According to the manufacturing method of a rotor of electric rotating machines as described above, an appropriate amount of resin 7 can be applied between the conductors axially adjacent to each other in the spool 5, or the conductors adjacent to each other as upper layers on the outer circumferential side, thus enabling the resin 5 to be arranged uniformly all over the multi-rows and multi-layers of conductor in the spool.

Since the resin is applied to the conductor every winding, the amount of resin can be freely increased or decreased at any desired point of winding. It is a matter of course that resin is applied evenly all over at least at the deep layer portion. Further, it is possible to manufacture various patterns of resin at low cost.

Although according to the above-described embodiment, heating is done at the stage of the conductor having been wound around the spool, it is preferable that heat curing is done after the spool wound with the conductor has been integrated into the iron core.

Further, unlike in the case of prior arts, the resin 7 is interposed all over between the conductors to counter the centrifugal force, so that it becomes unnecessary to, e.g., wind a protective tape on the outer side of the outermost layer of the conductor as a final step except under special circumstances.

As described above, according to the first embodiment of the invention, since the resin 7 is arranged uniformly and all over filling the gaps between the conductors 6 wound around the spool 5, it is possible to hold the conductor 6 at a predetermined position against the centrifugal force without fail. Accordingly, there will be no trouble that the conductors 6 are rubbed with each other to be disconnected. Furthermore, there will remain little air to be interposed around the conductors, which are accommodated in the spool 5, so that heat conduction is sharply improved. Since the heat conduction is mainly carried out via the resin (having about ten times as high as heat conductivity of the air), a temperature of conductor in the spool is made to drop, thus enabling to improve an output from the power generator per number of windings.

In addition, what is important is that excess air, which is interposed between the conductors, is replaced with resin. It is not necessarily intended for the resin to be filled one hundred percent.

Further, according to the invention, heat conduction in a winding area that is surrounded thickly by the winding therearound, that is, heat conduction in a deep portion 22 of the field winding is improved, so that it becomes possible to discharge heat that is otherwise kept therein with no way out. In this manner, there will be a smaller thermal difference between a non-deep layer portion 23 to be cooled with moving air generated by the rotation (winding area where the spool or the external space is present in the vicinity in the state in which winding has been completed) and the mentioned deep portion 22. Cooling leveling, in other words, cooling efficiency of the overall winding will be improved.

Additionally, a winding to be wound around is one continuous mass, and therefore the overall cooling efficiency tends to be decreased due to presence of any site of high temperature. From this viewpoint, the above-mentioned cooling leveling leads to remarkable improvement in cooling efficiency.

The area of resin to be uniformly applied occupying the gaps between the aligned conductors is preferred to be densely provided within an area smaller than gaps between the aligned conductors, i.e., between the conductors except for the resin. This will adjust the resin 7 to be filled to the minimal amount, thus enabling to prevent manufacturing cost, heat efficiency and space efficiency from getting worse.

Furthermore, according to the above-described embodiment, the conductor 6 is a round wire having 0.8 mm in diameter. However, in case of a round wire of not less than 0.5 mm in diameter, almost the same effect can be obtained. This is based on the fact that a certain cross sectional area of the resin located respectively in the spaces between the conductors is needed. Further, when the number of layers is not less than 10 layers, heat is hard to be discharged, and the deep layer portion 22 where the impregnated resin is not filled all over may be made. According to the invention, however, it is possible to assure higher reliability and temperature improvement of the winding conductor even at such deep layer portion 22.

Embodiment 2

Figure 4:
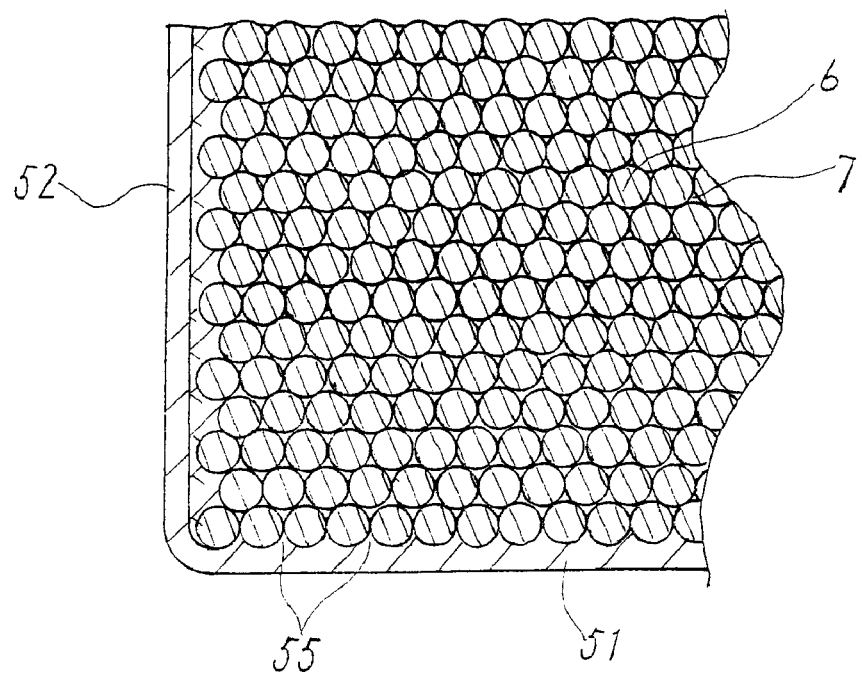
FIG. 4 is an enlarged cross sectional view of an essential part of a spool portion showing a second embodiment according to the invention.

FIG. 4 shows a second embodiment of the invention. With reference to FIG. 4 there is provided continuous convex portions 55 having an undulated configuration on the outer circumferential surface of the hollow part 51 (on the side opposite to the iron core tubular portions 3*b*) so that the conductor 6, which is wound on these convex portions 55, may be fit evenly. These convex portions 55 are formed by resin molding in conformity with a size (diameter) of the conductor 6 to be used simultaneously at the time of molding the spool 5.

According to the second embodiment of the invention, a gap between the outer circumferential surface of the above-mentioned hollow part 51 and the innermost layer (first layer) of the conductor 6 can preliminarily be made smaller (normally, this gap may be larger than gaps between the conductors on and from the second layer), which results in application of a smaller and appropriate amount of resin. Furthermore, there is no excess resin interposed much near to the iron core, thus enabling to obtain good thermal properties and achieve cost reduction.

Embodiment 3

Figure 5:
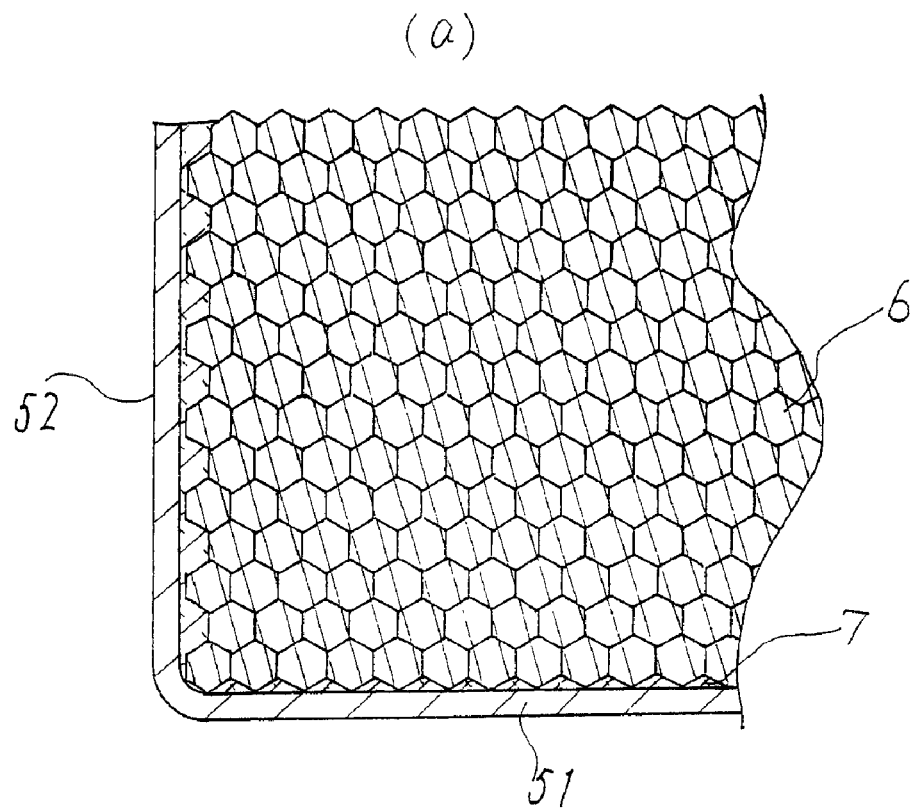
FIG. 5(*a*) is an enlarged cross sectional view of an essential a spool portion showing a third embodiment according to the invention.
Figure 5:
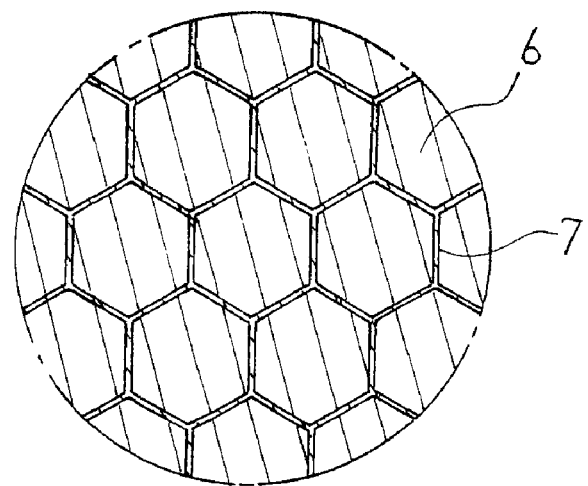

Although according to either of the above-mentioned two embodiments, the case where the conductors 6 are round wires is shown, this is based on the fact that the round wires are easily available and universally used. However, even if, as shown in FIG. 5, a cross section of wires is non-round, or polygon-shaped such as hexagon, in a rotor in which a conductor is densely wound in a spool, the situation of some gaps being formed between the conductors remains unchanged, and the method according to the invention can be also applied to achieve the intended purpose. Further, in the case where a cross section of the conductor is rectangular and the conductor is wound in alignment facing to each other, there is a relatively smaller space between these faces. However actually, due to the fact that R-shapes are necessarily made at face corners of the winding thereby providing electrical isolation therebetween, substantially the same configuration as that between the round wires is formed at these sites. Furthermore, even in the case of conductors having such polygonal cross section, on the supposition that a diameter of the cross section of a round wire is not less than 0.5 mm, the invention is likewise effective, Industrial Applicability As described above, the rotor of an electric rotating machine according to the invention is applicable not only to be rotor of an AC generator for use in vehicles, but also is widely applicable to a rotor of any other electric rotating machine in which a conductor is wound in multi-rows and multi-layers.

The invention claimed is:

1. A manufacturing method of a rotor of an electric rotating machine comprising, the method comprising:
    winding a conductor on a spool under a predetermined tension;
    applying a fluid resin material to the conductor in the course of said winding; and
    heating the spool wound with the resin material to cause said fluid resin material to be heat-cured,
    wherein convex portions are provided at an outer circumference of a hollow part of the spool so as to be positioned between rows of the conductor wound on the spool,
    wherein the convex portions have an undulated configuration on the outer circumferential surface, and
    wherein gaps between aligned conductors are filled uniformly with the resin so that little air remains interposed around the aligned conductors accommodated on the spool.

2. The manufacturing method of a rotor of an electric rotating machine according to claim 1, further comprising adjusting an amount of resin applied with respect to the conductor so that the resin occupying a gap between the aligned conductors does not completely fill the gap between the aligned conductors.

3. The manufacturing method of a rotor of an electric rotating machine according to claim 1, further comprising adjusting an amount of resin applied with respect to the conductor so that the resin occupying a gap between the aligned conductors completely fills the gap between the aligned conductors.

4. The manufacturing method of a rotor of an electric rotating machine according to claim 1, wherein the cured resin occupies gaps between the aligned conductors from an innermost layer of the conductors to an outermost layer of the conductors.

5. The manufacturing method of a rotor of an electric rotating machine according to claim 4, wherein the cured resin occupies substantially all gaps between substantially all the aligned conductors from the innermost layer of the conductors to the outermost layer of the conductors so that substantially no air remains interposed around substantially all the aligned conductors accommodated on the spool.

6. The manufacturing method of a rotor of an electric rotating machine according to claim 1, wherein gaps between aligned conductors are filled uniformly with the resin so that substantially no air remains interposed around the aligned conductors accommodated on the spool.

* * * * *